(12) United States Patent
Jurkovic et al.

(10) Patent No.: US 11,653,720 B2
(45) Date of Patent: May 23, 2023

(54) CONTROLLING THE QUALITY OF A MANUFACTURED ARTICLE

(71) Applicant: NIKE, Inc., Beaverton, OR (US)

(72) Inventors: Dragan Jurkovic, Taichung (TW); Chun-Wei Huang, Changhua County (TW); Jen-Chuan Lin, Tainan (TW); Shih-Yuan Wu, Taichung (TW); Chih-Chun Chai, Taichung (TW); Ming-Ji Lee, ChungHua (TW); Chien-Liang Yeh, ChungHua (TW)

(73) Assignee: NIKE, Inc., Beaverton, OR (US)

( * ) Notice: Subject to any disclaimer, the term of this patent is extended or adjusted under 35 U.S.C. 154(b) by 42 days.

(21) Appl. No.: 17/324,888

(22) Filed: May 19, 2021

(65) Prior Publication Data
US 2021/0267318 A1 Sep. 2, 2021

Related U.S. Application Data

(63) Continuation of application No. 15/990,253, filed on May 25, 2018, now Pat. No. 11,109,645.
(Continued)

(51) Int. Cl.
*A43B 13/04* (2006.01)
*A43B 13/32* (2006.01)
(Continued)

(52) U.S. Cl.
CPC .............. *A43D 63/00* (2013.01); *A43B 13/04* (2013.01); *A43B 13/32* (2013.01); *A43D 25/20* (2013.01);
(Continued)

(58) Field of Classification Search
CPC .... A43B 13/04; A43B 13/32; A43D 2200/10; A43D 2200/40; A43D 2200/60;
(Continued)

(56) References Cited

U.S. PATENT DOCUMENTS

| | | |
|---|---|---|
| 2,890,975 A | 6/1959 | Lenz |
| 4,996,012 A | 2/1991 | Gierschewski et al. |

(Continued)

FOREIGN PATENT DOCUMENTS

| | | |
|---|---|---|
| CN | 202774484 U | 3/2013 |
| CN | 205106586 U | 3/2016 |

(Continued)

*Primary Examiner* — Jeffrey P Aiello
(74) *Attorney, Agent, or Firm* — Shook, Hardy & Bacon L.L.P.

(57) ABSTRACT

Systems and methods for monitoring the quality of a surface treatment applied to an article in a manufacturing process are provided. A surface treatment may be applied to at least a portion of an article. A thermal profile of the article may be obtained and used to determine temperature indications of different regions of the article to which the surface treatment has been applied. A standard model of the article may be obtained that includes model regions having model temperature ranges. The temperature indications of the article can be compared with the model temperature ranges to determine if any temperature indications are outside of a corresponding model temperature range. The article may be a shoe part. The surface treatments may include the application of heat, plasma, dye, paint, primer, and/or the application of other materials, substances, and/or processes.

20 Claims, 13 Drawing Sheets

Related U.S. Application Data

(60) Provisional application No. 62/512,971, filed on May 31, 2017.

(51) Int. Cl.

| | | |
|---|---|---|
| *A43D 25/20* | (2006.01) | |
| *A43D 37/00* | (2006.01) | |
| *A43D 63/00* | (2006.01) | |
| *B05D 3/14* | (2006.01) | |
| *B32B 38/00* | (2006.01) | |
| *G01N 25/72* | (2006.01) | |
| *G05B 19/418* | (2006.01) | |

(52) U.S. Cl.
CPC ............ *A43D 37/00* (2013.01); *B05D 3/142* (2013.01); *B32B 38/0008* (2013.01); *G01N 25/72* (2013.01); *G05B 19/41875* (2013.01); *A43D 2200/10* (2013.01); *A43D 2200/40* (2013.01); *A43D 2200/60* (2013.01); *B32B 2437/02* (2013.01); *G05B 2219/37431* (2013.01); *G05B 2219/45243* (2013.01); *G05B 2219/50209* (2013.01)

(58) Field of Classification Search
CPC ........ A43D 25/20; A43D 37/00; A43D 63/00; B05D 3/142; B32B 2437/02; B32B 38/0008; G01N 25/72; G05B 19/41875; G05B 2219/37431; G05B 2219/45243; G05B 19/50209
See application file for complete search history.

(56) References Cited

U.S. PATENT DOCUMENTS

| | | | | |
|---|---|---|---|---|
| 5,859,775 | A | 1/1999 | Barlage et al. | |
| 6,104,556 | A | 8/2000 | Schaenzer | |
| 6,395,791 | B1* | 5/2002 | Chaudhary | B29B 9/14 |
| | | | | 521/134 |
| 6,660,667 | B2* | 12/2003 | Zuckerman | D04H 11/00 |
| | | | | 442/131 |
| 7,167,773 | B2* | 1/2007 | Schneider | B29C 35/0288 |
| | | | | 702/53 |
| 8,168,257 | B2* | 5/2012 | Lambert | B29D 35/146 |
| | | | | 427/272 |
| 9,451,810 | B2* | 9/2016 | Regan | A43D 111/006 |
| 10,096,499 | B2* | 10/2018 | Takenaga | H01L 21/67248 |
| 2002/0005968 | A1* | 1/2002 | Suzuki | H04J 14/0295 |
| | | | | 398/79 |
| 2002/0167987 | A1 | 11/2002 | Schlagheck et al. | |
| 2005/0186327 | A1* | 8/2005 | Saito | G01N 25/72 |
| | | | | 427/8 |
| 2006/0114965 | A1* | 6/2006 | Murphy | G01N 25/72 |
| | | | | 374/E11.003 |
| 2006/0228465 | A1* | 10/2006 | Zurecki | C21D 1/667 |
| | | | | 427/446 |
| 2007/0275172 | A1* | 11/2007 | Cowles | B05D 7/02 |
| | | | | 427/430.1 |
| 2008/0087359 | A1 | 4/2008 | Zurecki et al. | |
| 2010/0183879 | A1* | 7/2010 | Coulson | H01J 37/32449 |
| | | | | 118/723 VE |
| 2010/0288435 | A1* | 11/2010 | D'herbecourt et al. | |
| | | | | B32B 38/162 |
| | | | | 156/272.6 |
| 2011/0001809 | A1 | 1/2011 | Mcmanus et al. | |
| 2011/0123093 | A1 | 5/2011 | Alloo et al. | |
| 2011/0282476 | A1* | 11/2011 | Hegemier | G06Q 10/087 |
| | | | | 705/26.5 |
| 2012/0221138 | A1* | 8/2012 | Hong | H01L 21/68764 |
| | | | | 700/299 |
| 2012/0280415 | A1 | 11/2012 | Halford | |
| 2014/0262010 | A1* | 9/2014 | Heineck | H05B 6/70 |
| | | | | 156/379.6 |
| 2014/0263294 | A1* | 9/2014 | Heineck | H05B 6/70 |
| | | | | 219/756 |
| 2014/0267353 | A1 | 9/2014 | Schmidt et al. | |
| 2015/0282786 | A1* | 10/2015 | Anand | A61B 90/50 |
| | | | | 600/438 |
| 2016/0064195 | A1* | 3/2016 | Lin | A43D 11/00 |
| | | | | 156/64 |
| 2016/0185048 | A1* | 6/2016 | Dave | B22F 10/28 |
| | | | | 700/119 |
| 2017/0150069 | A1 | 5/2017 | Parrish et al. | |
| 2017/0188664 | A1* | 7/2017 | Manz | A43D 25/07 |
| 2018/0343980 | A1 | 12/2018 | Jurkovic et al. | |

FOREIGN PATENT DOCUMENTS

| | | |
|---|---|---|
| FR | 2911255 A1 | 7/2008 |
| JP | 2002-234113 A | 8/2002 |

\* cited by examiner

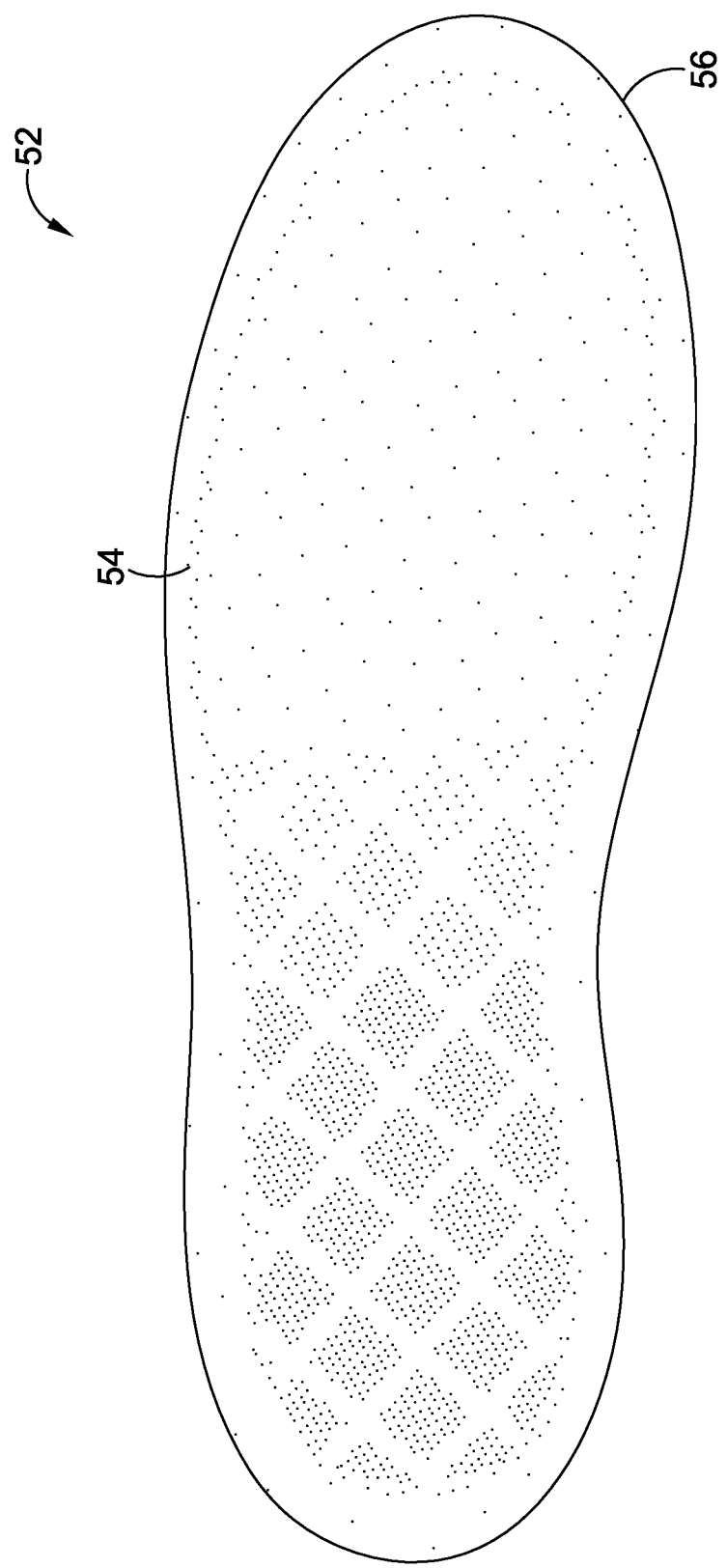

| | |
|---|---|
| Standard Model: | Template Model Name [78] (88) |
| | Template M/F [Male] (90) |
| | Template Size [9] (92) |
| Selected Image: | Template L/R [Left] (94) |

☑ Standard QC Method

| | |
|---|---|
| MODEL TEMP | MIN +- [100] (96) |
| TEMP RANGE | MAX +- [105] (98) |

CONTROLLING THE QUALITY OF A MANUFACTURED ARTICLE

CROSS-REFERENCE TO RELATED APPLICATIONS AND PRIORITY CLAIM

This application is a continuation of co-pending U.S. patent application Ser. No. 15/990,253, filed May 25, 2018, titled "Controlling the Quality of a Manufactured Article," which claims priority to U.S. Provisional Patent App. No. 62/512,971, filed May 31, 2017, titled "Controlling the Quality of a Manufactured Article." The entire contents of each of these applications is incorporated herein by reference.

TECHNICAL FIELD

The field relates to quality control of manufactured articles.

BACKGROUND

Manufacturing and assembling articles sometimes requires applying surface treatments to materials used to form the articles. Surface treatments might include, for example, the application of heat, plasma, primer, adhesive, paint, and/or dye, among other treatments, to the materials to facilitate different manufacturing processes (e.g., preparation of materials for adhesive bonding). As a result, the use of a surface treatment in a manufacturing process may affect a quality of an article that is produced.

SUMMARY

This summary is intended to provide a high-level overview of this disclosure and to introduce a selection of concepts that are further described below in the detailed description section hereof. This summary is not intended to identify key or essential features of the subject matter of this disclosure, and is also not intended to be used as an aid in isolation to determine the scope of the claimed subject matter.

In brief, and at a high level, this disclosure describes, among other things, methods and systems for controlling the quality of manufactured articles. More specifically, aspects hereof provide for monitoring the application of surface treatments to articles in a manufacturing process to determine if desired parameters for the surface treatments have been achieved.

In an exemplary aspect, a surface treatment, such as an application of plasma, heat, adhesive, paint, dye, primer, etc., is applied to an article (e.g., a shoe part) to facilitate a particular manufacturing process (e.g., adhesive bonding of the shoe part). A thermal profile of the article is obtained to determine temperature indications of different regions of the article after the surface treatment has been applied. A standard model of the article is then accessed that includes model regions with model temperature ranges, the model regions corresponding to the regions of the article in the thermal profile. The temperature indications obtained from the thermal profile may be compared to the corresponding model temperature ranges of the standard model to determine if the temperature indications are within the model temperature ranges. As a result, a quality and/or effectiveness of the surface treatment applied to the article may be determined.

In one exemplary aspect hereof, a method for monitoring the application of a surface treatment to an article in a manufacturing process is provided. The method comprises applying a surface treatment to at least a portion of an article, receiving a thermal profile of at least a portion of the article, determining a first temperature indication of a first region of the article from the thermal profile, determining a second temperature indication of a second region of the article from the thermal profile, and accessing a standard model for the article. The standard model comprises a first model region that corresponds to the first region, the first model region having an associated first model temperature range, and a second model region that corresponds to the second region, the second model region having an associated second model temperature range. The method further comprises comparing the first temperature indication to the first model temperature range to determine if the first temperature indication is outside of the first model temperature range, and comparing the second temperature indication to the second model temperature range to determine if the second temperature indication is outside of the second model temperature range.

In another exemplary aspect hereof, one or more computer-readable media having computer-executable instructions stored thereon are provided that, when executed by one or more computer processors, perform a method for monitoring application of a surface treatment to articles in a manufacturing process. The method comprises receiving a thermal profile of at least a portion of an article to which a surface treatment has been applied, the thermal profile comprising a first temperature indication of a first region of the article and a second temperature indication of a second region of the article. The method further comprises accessing a standard model of the article comprising a first model region that corresponds to the first region, the first model region having a first model temperature range, and a second model region that corresponds to the second region, the second model region having a second model temperature range. The method further comprises comparing the first temperature indication to the first model temperature range to determine if the first temperature indication is outside of the first model temperature range, and comparing the second temperature indication to the second model temperature range to determine if the second temperature indication is outside of the second model temperature range.

In another exemplary aspect hereof, a system for monitoring application of a surface treatment to articles in a manufacturing process is provided. The system comprises at least one surface treatment tool, at least one thermal-imaging device, at least one processor, and one or more computer-readable media storing computer-executable instructions thereon that, when executed by the at least one processor, cause the at least one processor to perform a method comprising receiving, from the thermal-imaging device, a thermal profile of at least a portion of an article to which a surface treatment has been applied by the at least one surface treatment tool. The thermal profile comprises a first temperature indication of a first region of the article and a second temperature indication of a second region of the article. The method further comprises accessing a standard model of the article comprising a first model region that corresponds to the first region, the first model region comprising a first model temperature range, and a second model region that corresponds to the second region, the second model region comprising a second model temperature range, comparing the first temperature indication to the first model temperature range to determine if the first temperature indication is outside of the first model temperature range, and comparing the second temperature indication to the second model temperature range to determine if the second temperature indication is outside of the second model temperature range.

The term "article" as used herein includes any manufactured article as well as any material/portion used to form a manufactured article. As such, an article as used herein may include, but is not limited to, a material, composite, substance, layer, substrate, textile, polymer, and/or any combination of the same. For example, an article may be a shoe part (e.g., an outsole, midsole, and/or upper of a shoe that includes one or more polymer materials (e.g., Ethyl Vinyl Acetate ("EVA")). An article may also include one or more synthetic materials and/or one or more natural materials. The above-provided examples are intended to be exemplary and non-limiting, and other types of articles are contemplated as within the scope of the present disclosure.

BRIEF DESCRIPTION OF THE FIGURES

The subject matter of the present disclosure is described in detail herein with reference to the attached figures, which depict exemplary and non-limiting aspects hereof, wherein:

FIG. 3A depicts a thermal profile of an article to which a surface treatment has been applied, in accordance with an aspect hereof;

FIG. 5 depicts an enhanced view of a portion of the GUI of FIG. 4 used for inputting article-identifying information, in accordance with an aspect hereof;

DETAILED DESCRIPTION

Figure 1:
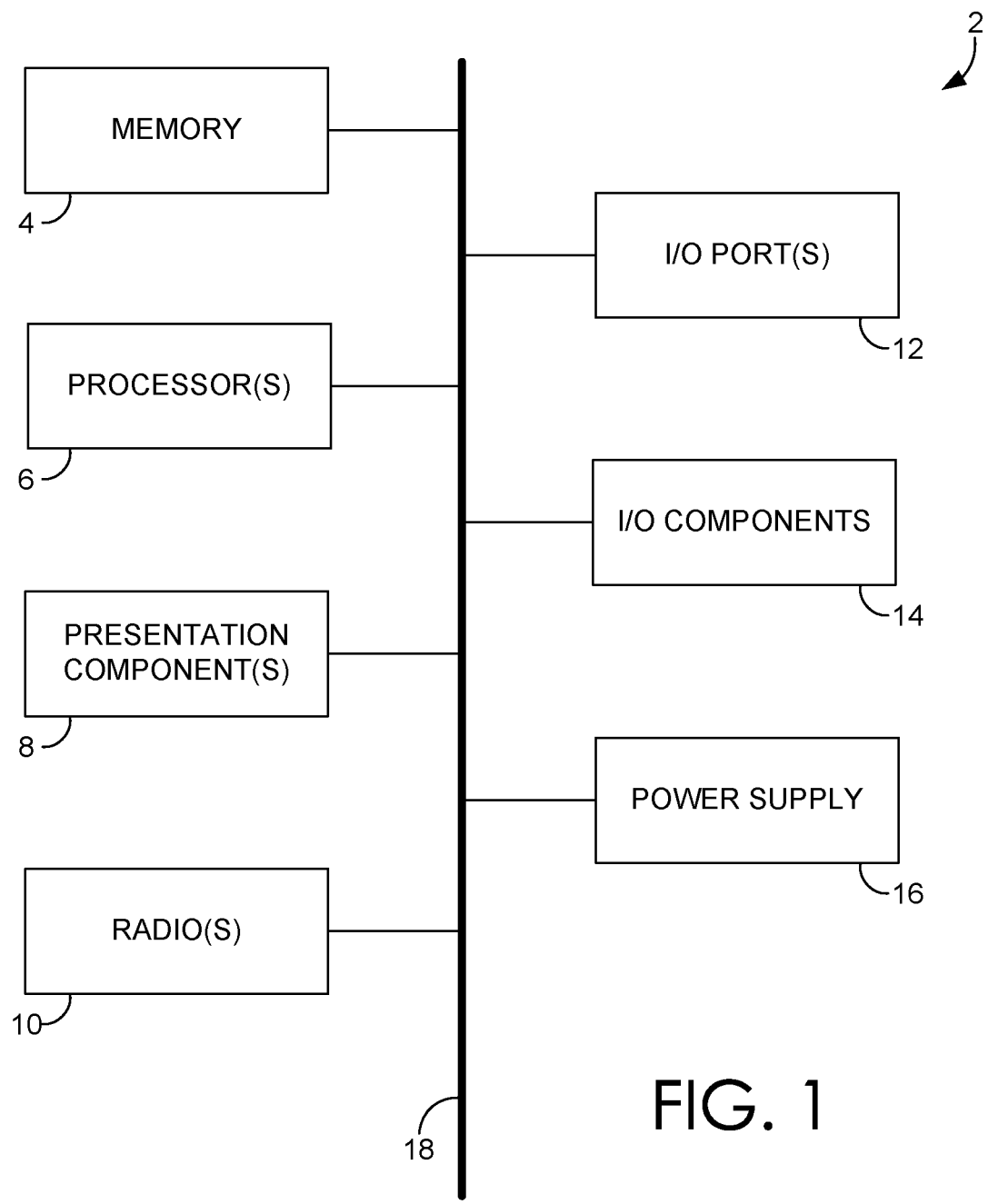
FIG. 1 depicts an exemplary computing environment suitable for monitoring the application of a surface treatment to an article in a manufacturing process, in accordance with an aspect hereof.

The subject matter of the present disclosure is described with specificity herein to meet statutory requirements. However, the description is not intended to limit the scope of the present disclosure. Rather, the claimed subject matter may be provided in other ways, to include different features, steps, and/or combinations of features and/or steps, similar to the ones described in this disclosure, and in conjunction with other present and/or future technologies. The terms "step" and "block" should not be interpreted as implying any particular order among or between individual steps of the methods employed unless and except when the order of individual steps is explicitly described and required.

This disclosure relates generally to quality control of manufactured articles that is achieved by monitoring temperature profiles of the articles after the application of one or more surface treatments to the articles. In this sense, the monitoring process may be used to determine a quality and/or effectiveness of a surface treatment, such as a plasma treatment, heat treatment, coating treatment (e.g., paint, dye, primer, etc.), and/or physical treatment (e.g., abrading or polishing, etc.), applied to the article. As a result, articles may be manufactured with a more consistent degree of quality because articles that do not achieve desired parameters after a surface treatment may be identified and/or provided with additional and/or alternative processing.

The subject matter of the present disclosure may be provided as, among other things, a method, a system, and/or a computer-program product. Accordingly, aspects herein may take the form of hardware, or may be a combination of software and hardware. A computer-program that includes computer-useable instructions embodied on one or more computer-readable media may also be used. The subject matter of the present disclosure may further be implemented as hard-coded into the mechanical design of computing components and/or may be built into an apparatus or system for monitoring the application of surface treatments to articles in a manufacturing process.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided herein. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Turning now to FIG. 1, a block diagram of an exemplary computing device 2 suitable for use in monitoring a surface treatment applied to an article in a manufacturing process is provided, in accordance with an aspect hereof. It should be noted that although some components depicted in FIG. 1 are shown in the singular, they may be plural, and the components may be connected in a different, including distributed, configuration. For example, computing device 2 might include multiple processors and/or multiple radios. As shown in FIG. 1, computing device 2 includes a bus 18 that may directly or indirectly connect different components together, including memory 4, processor(s) 6, presentation component(s) 8 (if applicable), radio(s) 10, input/output (I/O) port(s) 12, input/output (I/O) component(s) 14, and power supply 16.

Memory 4 may take the form of the memory components described herein. Thus, further elaboration will not be provided here, but it should be noted that memory 4 may include any type of tangible medium that is capable of storing information, such as a database. A database may include any collection of records, data, and/or other information. In one aspect, memory 4 may include a set of computer-executable instructions that, when executed, facilitate various functions or steps disclosed herein. These instructions will variously be referred to as "instructions" or an "application" for short. Processor 6 may actually be multiple processors that may receive instructions and process them accordingly. Presentation component 8 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or even a lighted keyboard).

Radio 10 may facilitate communication with a network, and may additionally or alternatively facilitate other types of wireless communications, such as Wi-Fi, WiMAX, LTE, Bluetooth, and/or other VoIP communications. In various aspects, the radio 10 may be configured to support multiple technologies, and/or multiple radios may be configured and utilized to support multiple technologies.

Input/output (I/O) ports 12 may take a variety of forms. Exemplary I/O ports may include a USB jack, a stereo jack, an infrared port, a firewire port, and/or other proprietary communications ports. Input/output (I/O) components 14 may comprise one or more keyboards, microphones, speakers, touchscreens, and/or any other item useable to directly or indirectly input data into the computing device 2. Power supply 16 may include batteries, fuel cells, and/or any other component that may act as a power source to supply power to computing device 2 or to other network components.

Turning now to FIGS. 2A-2E, a variety of exemplary systems for monitoring the application of surface treatments to articles in a manufacturing process are provided, in accordance with aspects hereof. The exemplary articles depicted in FIGS. 2A-2E are shoe parts (e.g., midsole or outsole portions of a shoe). However, it should be noted that other types of articles may be processed with surface treatments and monitored for quality control in a similar fashion, and as such, the shoe parts shown in FIGS. 2A-2E are but one example provided for the purposes of explanation. Also, the components of the systems depicted in FIGS. 2A-2E are arranged in exemplary configurations, and as such, additional and/or alternative configurations, including those with different types, numbers, combinations, and/or arrangements of components, are contemplated herein.

Figure 2A:
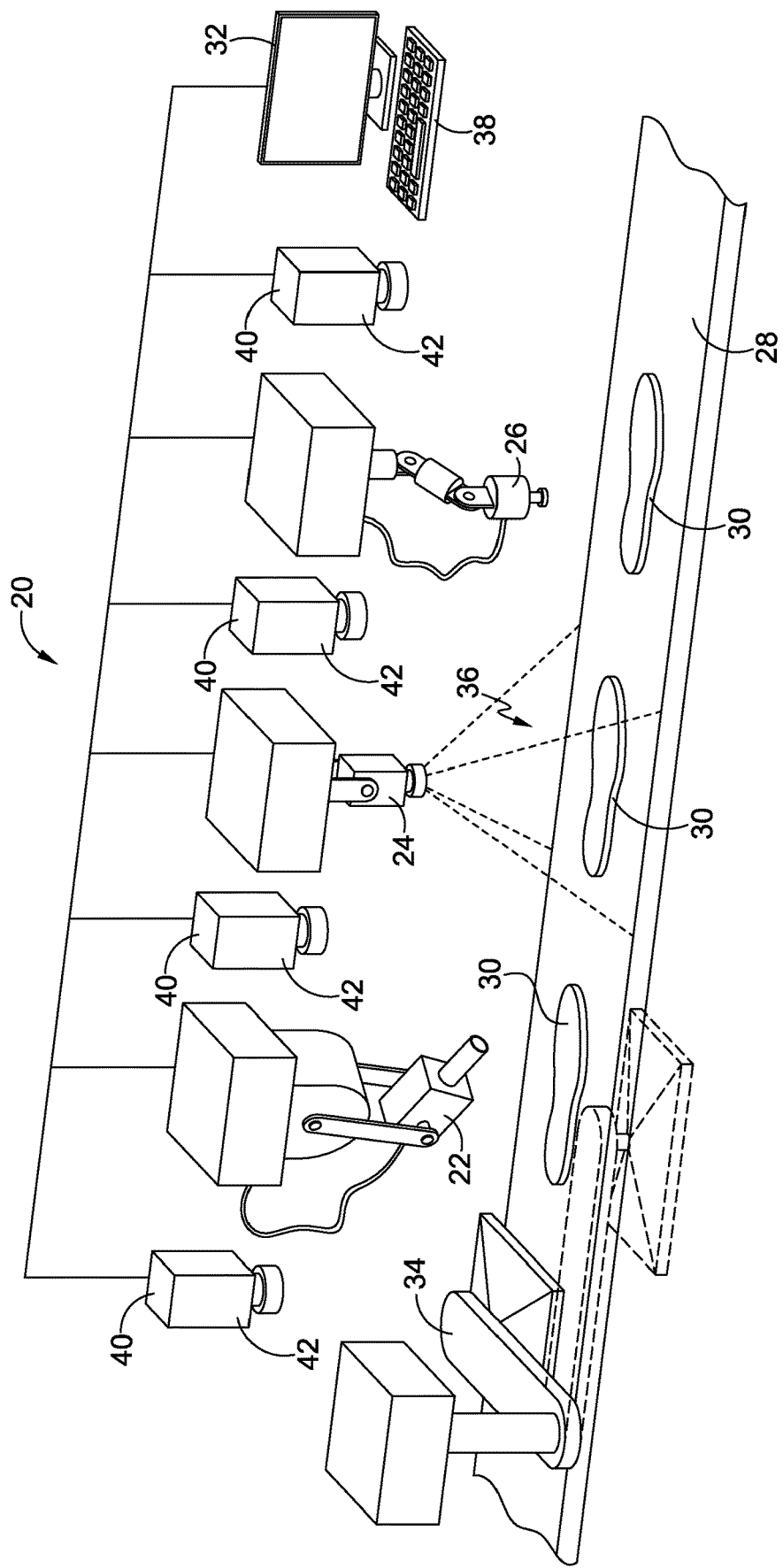
FIG. 2A depicts an exemplary system for monitoring the application of a surface treatment to an article in a manufacturing process, in accordance with an aspect hereof.

Referring now to FIG. 2A, an exemplary system 20 for monitoring the quality of a surface treatment provided to articles 30 in a manufacturing process is provided, in accordance with an aspect hereof. The system 20 includes a surface treatment tool 22, a thermal-imaging device 24, and an adhesive application tool 26 that are each positioned adjacent to an article-transporting device 28. The article-transporting device 28 (e.g., conveyer) positions the articles 30 for interaction with the components of the system 20 (e.g., under the surface treatment tool 22 and then under the thermal-imaging device 24).

The surface treatment tool 22 depicted in FIG. 2A may be one of a variety of different tools for modifying the articles 30. For example, the surface treatment tool 22 may be a plasma tool used to apply plasma to the articles 30 to modify a surface of the articles 30 in preparation for adhesive bonding (e.g., with another material, such as another shoe part). Alternatively, the surface treatment tool 22 may be a coating tool that provides a coating (e.g., a chemical-based primer) to the articles 30 (e.g., to prepare the articles 30 for adhesive bonding). It should be noted that the use of multiple surface treatment tools, of the same or different types, including at a common article-treatment location or at different article-treatment locations in the system 20, is possible and contemplated.

The thermal-imaging device 24 includes a camera (e.g., a forward looking infrared imaging camera configured to capture infrared images) that captures a thermal profile or signature of each of the articles 30 after the surface treatment has been applied by the surface treatment tool 22. Additionally, the article-transporting device 28, the surface treatment tool 22, and the thermal-imaging device 24 may be adjustable so that thermal profiles of each of the articles 30 can be captured within a desired time period of application of the surface treatment (e.g., within 1-60 seconds inclusive). In this sense, the timing of the thermal profile acquisition can be adjusted to account for heat transfer after the surface treatment is applied, as well as to account for the expected heat transfer for each surface treatment, and/or temperature ranges on which a standard model is based, among other factors.

The system 20 further includes a computing device 32 that may be in communication with the surface treatment tool 22, the thermal-imaging device 24, the article-transporting device 28, and/or the adhesive application tool 26, among other components. The computing device 32 may include one or more processors and one or more computer-readable media, and may be used to receive feedback on the surface treatment and monitoring process, and/or to direct the different operations performed by the system 20 (e.g., surface treatment of the articles 30 and/or thermal image capture). The computing device 32 may also include one or more input devices 38 (e.g., a keyboard and a display with a GUI as shown in FIG. 2A, in addition to other possible input devices) for receiving input from an operator. The input may be used to control the system 20 (e.g., by directing or adjusting the surface treatment tool 22) or may be used to provide article-identifying information that can be used to retrieve a standard model of the articles 30 from a database for comparison.

The system 20 also includes a vision system 40. The vision system 40 includes image-capturing devices 42 positioned at various locations in the system 20. The vision system 40 may be configured to capture images and/or video of the articles 30. The images/video may be used to determine identities of the articles 30 based on image recognition, and/or may be used to determine an orientation and/or position of the articles 30 in the system 20. As shown in FIG. 2A, the image-capturing devices 42 can be positioned at any location in the system 20, including before, between, after, and/or about (e.g., on opposite sides of) the different components of the system 20, including the surface treatment tool 22, the thermal-imaging device 24, the adhesive application tool 26, and/or the article-transporting device 28, as well as in any other position in the system 20.

The image-capturing devices 42 may be Charge Coupled Device ("CCD") cameras, or may be other types of imaging devices, scanners, and/or cameras. In different aspects, the image-capturing devices 42 may capture images from static and/or dynamic viewing positions (i.e., the image-capturing devices 42 may be stationary and/or may be configured for movement relative to the articles 30). The captured images may be used to generate a two-dimensional ("2D") profile of the articles 30, or, when a distributed configuration of the image-capturing devices 42 is used (e.g., a selection of cameras viewing the articles 30 from different angles), the captured images may be combined to generate a three-dimensional ("3D") profile of the articles 30. By capturing multiple images from different orientations and combining them to form a 3D profile, the quality of a surface treatment of a dimensional article (e.g., a formed outsole portion of an article of footwear) can be monitored using a thermal profile and a standard model as well.

Further depicted in the system 20 is a part-transfer tool 34 that may be positioned at any location in the system 20 and used to move the articles 30 to different locations as needed. In FIG. 2A, the part-transfer tool 34 is positioned downstream of the surface treatment tool 22 and the thermal-imaging device 24 and may be configured to transfer the articles 30 for the purposes of (1) re-application of a surface treatment by the surface treatment tool 22, (2) application of a surface treatment at another manufacturing station, (3) discarding or recycling of the articles 30, and/or (4) providing subsequent processing of the articles 30 (e.g., further bonding, assembly, buffing, cleaning, packaging, etc.). The part-transfer tool 34 may utilize vacuum forces, mechanical gripping forces, magnetic forces, adhering forces, and/or other pickup forces for retaining, transferring, and releasing the articles 30 at different locations about the system 20. In alternative aspects, the part-transfer tool 34 may be positioned at other locations in the system 20 (e.g., upstream of the surface treatment tool 22), such as for placing the articles 30 on the article-transporting device 28. One or more additional part-transfer tools may be used in the manufacturing process as well.

The adhesive application tool 26 may be adapted to provide, at the direction of the computing device 32, adhesive (e.g., cement or glue) to the articles 30 for a subsequent bonding process. Additionally, the adhesive application tool 26 may be programmed to follow a pre-determined tool path when applying the adhesive to the articles 30. Although not depicted in FIG. 2A, one or more additional part-manipulating apparatuses may be used for bonding the articles 30 with other materials once adhesive is applied (e.g., an apparatus may place the materials on the articles 30). It should be noted that in some aspects no adhesive application tool 26 is used.

The system 20 may be configured to perform a quality control process on the articles 30 to determine if the application of a surface treatment to the articles 30 has achieved desired parameters suitable for the manufacturing process. For example, an article 30 may be provided on the article-transporting device 28, and a surface treatment (e.g., plasma, heat, primer, etc.) may be applied to the article 30. Within a selected time period (e.g., within 1-60 seconds), one or more thermal images of the article 30 may be captured. A standard model of the article 30 including model temperature ranges is then accessed for comparison with the one or more thermal images. Then, a determination can be made if the article 30, including individual regions thereof, has achieved a desired temperature profile or standard based on comparison with the standard model. If the parameters are satisfied, additional processes, such as adhesive application by the adhesive application tool 26 and bonding of the article 30 with another article or material may be performed. Alternatively, if the desired parameters are not satisfied (e.g., at least one region of the article 30 is determined to be outside of a model temperature range), the article 30 may be processed differently to account for the determination (e.g., another surface treatment may be applied, the article 30 may be discarded, the manufacturing process may be repeated, restricted, stopped, and/or adjusted, etc.).

Figure 2B:
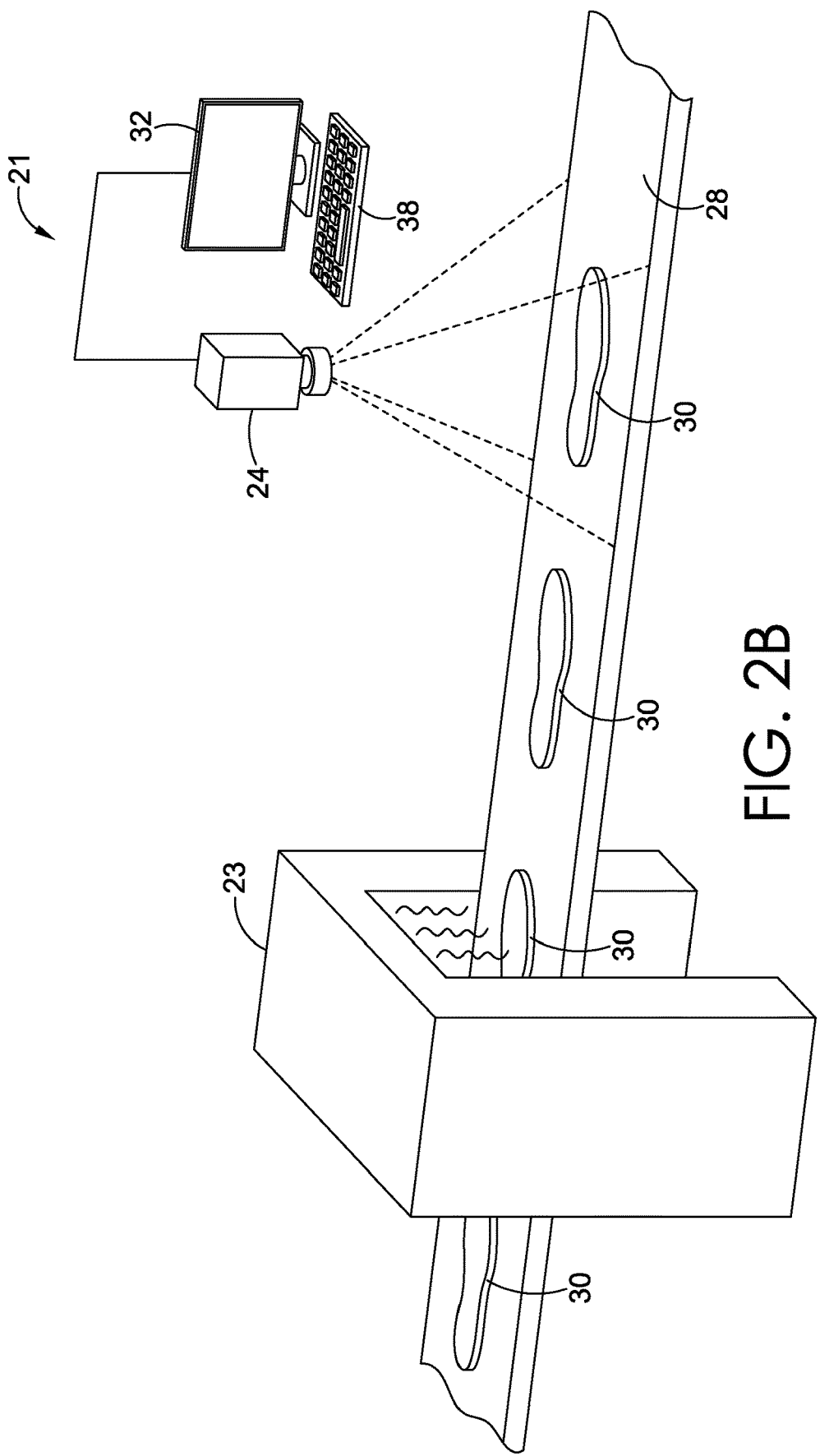
FIG. 2B depicts another exemplary system for monitoring the application of a surface treatment to an article in a manufacturing process, in accordance with an aspect hereof.

Referring to FIG. 2B, another exemplary system 21 for monitoring the quality of a surface treatment applied to articles 30 in a manufacturing process is provided, in accordance with an aspect hereof. In the system 21, the surface treatment is an application of heat used to increase a temperature of the articles 30 (e.g., to a desired minimum, maximum, and/or range). The system 21 includes the article-transporting device 28 which advances the articles 30 through a thermal energy tool 23, which in FIG. 2B is provided as an oven for heating the articles 30. The thermal energy tool 23 may be configured to provide conductive, convective, and/or radiative heat to the articles 30, and may be used to heat treat the articles for a desired manufacturing effect (e.g., melting, curing, etc.). The heat treatment may be performed and monitored at one or multiple times during an article manufacturing process.

In FIG. 2B, the thermal-imaging device 24 is provided downstream of the thermal energy tool 23 to allow thermal images of the articles 30 to be captured (e.g., using an infrared camera) after the heat treatment process. The thermal images may be used to generate thermal profiles of the articles 30 that may be compared to a standard model of the articles 30 that is accessed using the computing device 32. If desired temperature parameters are achieved, the manufacturing process may proceed to subsequent manufacturing steps (e.g., further assembly, adhesive bonding, painting, polishing, etc.). If desired temperature parameters are not achieved, additional or alternative manufacturing processes, such as re-application of the heat treatment, moving of the article 30 to another manufacturing station, adjusting the operation of the thermal energy tool 23, and/or discarding of the article 30 may occur. As discussed with respect to FIG. 2A, one or more vision systems, part-transfer tools, part-manipulation tools, and/or additional processing components may be used with the system 21 as needed to accommodate a particular manufacturing process.

Figure 2C:
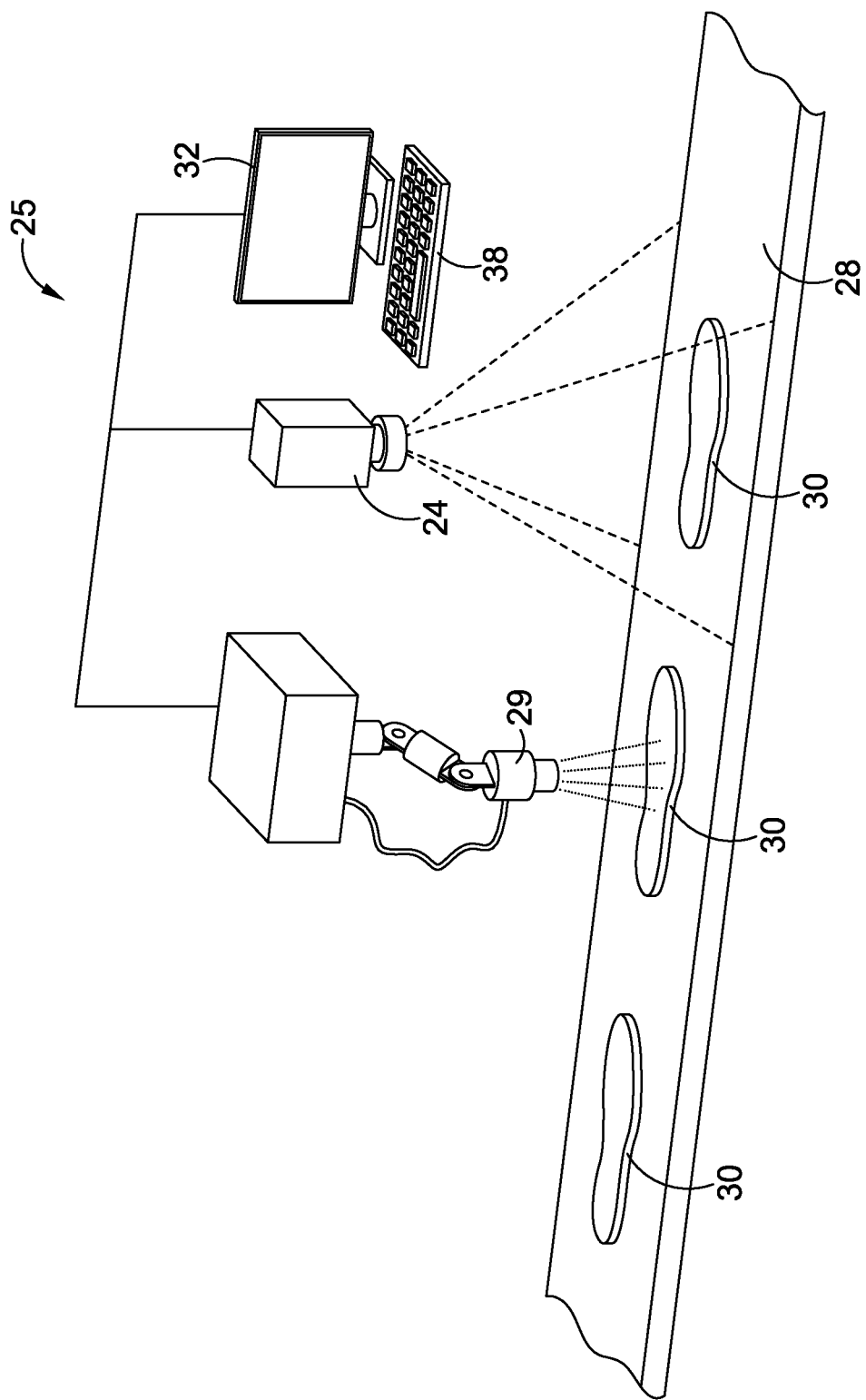
FIG. 2C depicts another exemplary system for monitoring the application of a surface treatment to an article in a manufacturing process, in accordance with an aspect hereof.

Referring to FIG. 2C, another exemplary system 25 for monitoring a surface treatment applied to articles 30 in a manufacturing process is provided, in accordance with an aspect hereof. In FIG. 2C, the surface treatment is the application of a coating to the articles 30 (e.g., paint, dye, primer, adhesive, etc.). Once again, the article-transporting device 28 is provided, which advances the articles 30 to a coating tool 29. The coating tool 29 is adapted to provide a coating to at least a portion of each of the articles 30 (e.g., using a pre-programmed tool path and dispersion, which may be controlled by the computing device 32). Once a coating has been applied to an article 30, the article 30 is advanced using the article-transporting device 28 to a field of view of the thermal-imaging device 24 for thermal image capture and temperature analysis.

The thermal-imaging device 24 may be used to capture one or more thermal images of the treated articles 30 so that a temperature profile can be generated for comparison with a standard model. The application of a coating, such as paint, primer, dye, adhesive, and/or another surface coating, may provide or absorb thermal energy from the articles 30, resulting in a change in the temperature profile of the articles 30. As a result, temperature indications of the treated regions of the article 30 obtained from the thermal profile can be compared with model regions of the standard model to determine whether each region treated with the coating has been adequately treated based on the temperature indication not being outside of a model temperature range of a corresponding model region of the standard model.

Figure 2D:
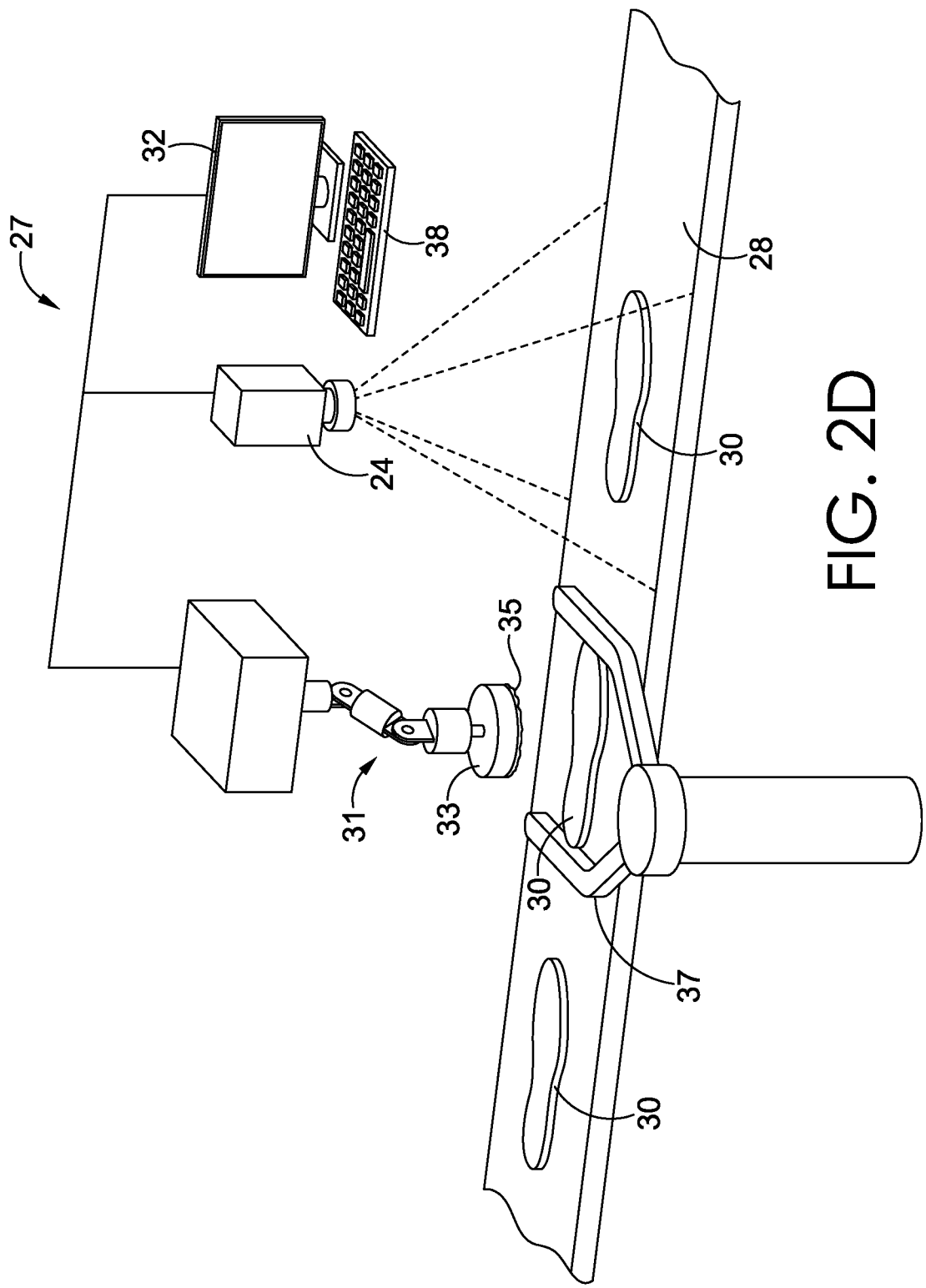
FIG. 2D depicts another exemplary system for monitoring the application of a surface treatment to an article in a manufacturing process, in accordance with an aspect hereof.

Referring to FIG. 2D, another exemplary system 27 for monitoring a surface treatment applied to articles 30 in a manufacturing process is provided, in accordance with an aspect hereof. The system 27 shown in FIG. 2D includes an exemplary physical processing tool 31 that includes a rotatable roughing/polishing tool 33 having an article-contacting portion 35, the thermal-imaging device 24, the article-transporting device 28, and the computing device 32. Although a rotatable roughing/polishing tool 33 is depicted in FIG. 2D, the physical processing tool 31 may be any type of tool that can provide a physical manipulation to the surface of the articles 30. FIG. 2D also depicts a holder 37 for maintaining the position of the articles 30 during the surface treatment.

In an exemplary operation, the physical processing tool 31 provides a surface treatment to the articles 30 (e.g., by roughing/polishing a surface of the articles 30), and subsequently, the article-transporting device 28 advances the articles 30 to a field of view of the thermal-imaging device 24, which captures one or more thermal images of the treated articles 30. The captured thermal images provide a thermal profile of the articles 30 that includes temperature indications of different regions of the articles 30 that have received the surface treatment. A standard model of the articles 30 may be accessed using the computing device 32. The temperature indications may be compared to model temperature ranges of corresponding model regions of the standard model to see if any temperature indications are outside of their corresponding model temperature range. As a result, a quality (e.g., an area covered, amount treated, temperature profile achieved, etc.) of the surface treatment may be determined.

As one example, if a temperature of 100-105° F. is desired for each region of the article 30 that receives the surface treatment, the quality control process may indicate a rejection of the article, a need for further processing, and/or an adjustment of the parameters of the surface treatment of the articles 30 if the temperature of any region (e.g., at least one, at least a certain number of regions, or all of the regions) has a temperature less than 100° F. or greater than 105° F. If all of the regions are within the corresponding model temperature ranges, the articles 30 may proceed to subsequent manufacturing steps (e.g., further assembly, painting, adhesive bonding, polishing, packing, etc.).

Figure 2E:
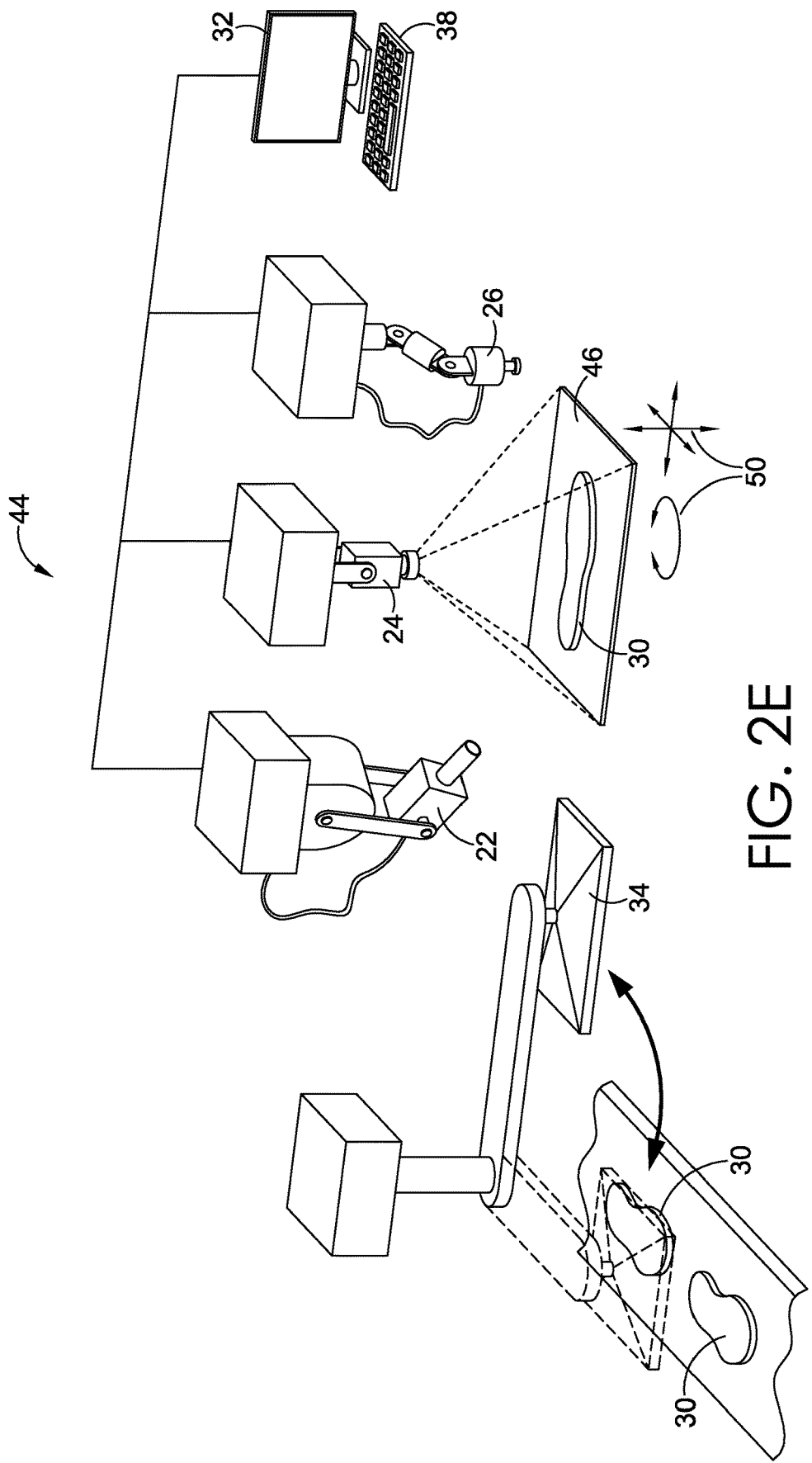
FIG. 2E depicts another exemplary system for monitoring the application of a surface treatment to an article in a manufacturing process, in accordance with an aspect hereof.

Referring to FIG. 2E, another exemplary system 44 for monitoring the application of a surface treatment to articles 30 in a manufacturing process is provided, in accordance with an aspect hereof. The system 44 depicted in FIG. 2E, similar to FIG. 2A, includes a surface treatment tool 22 that provides a surface treatment to the articles 30 (e.g., to prepare the articles 30 for adhesive bonding). The system 44 further includes the thermal-imaging device 24 and the adhesive application tool 26 as provided in the system 20 depicted in FIG. 2A. However, the system 44 of FIG. 2B is configured to provide a more individualized treatment of the articles 30. More specifically, the part-transfer tool 34 is positioned to transfer the articles 30 from the article-transporting device 28 to a part manufacturing station 46 adjacent to the surface treatment tool 22, the thermal-imaging device 24, and the adhesive application tool 26. The part manufacturing station 46 may be stationary, or may be movable in one or more directions (e.g., in one or more of an x, y, and z-plane, and/or rotationally about any of the same). As a result, the part manufacturing station 46 may be configured to move an article 30 thereon relative to the surface treatment tool 22, the thermal-imaging device 24, and the adhesive application tool 26, as shown by the directional indicators 50 provided in FIG. 2E. The surface treatment tool 22, the thermal-imaging device 24, and the adhesive application tool 26 may also be adapted to move relative to the part manufacturing station 46 and the article 30 thereon.

In an exemplary operation, the articles 30 are advanced on the article-transporting device 28. The part-transfer tool 34 retrieves one of the articles 30 and places it on the part manufacturing station 46. The surface treatment tool 22, which in the system 44 of FIG. 2E is adapted to apply a surface treatment that prepares the article 30 for adhesive bonding (e.g., by applying a primer, a treatment of plasma, etc.), applies the surface treatment across at least a portion of the article 30. The thermal-imaging device 24, within a selected time period (e.g., within 1-60 seconds of application of the surface treatment, and/or within 1-60 seconds of initiation or conclusion of the same), captures one or more thermal images of the article 30 used to obtain a thermal profile of the article 30 that includes a plurality of temperature indications. A standard model is accessed using the computing device 32, and the temperature indications from the thermal profile are compared to model temperature ranges of corresponding model regions of the standard model. If the temperature indications achieve desired parameters (e.g., none of the temperature indications are outside of corresponding model temperature ranges), the article 30 may be removed from the part manufacturing station 46 for continued processing.

It should be noted that in FIGS. 2A-2E, the spatial relation and location of components is modified for the purposes of clarity and explanation, and in actual use, may be different to account for the distance and range of motion needed for part transfer, part monitoring, surface treatment, etc. It should also be noted that different articles, different article-manipulating or article manufacturing tools (e.g., those configured for moving, modifying, treating, attaching, decorating, and/or otherwise manipulating the articles), and different configurations and operations of the same are contemplated herein. Furthermore, it should be noted that the selection, number, and arrangement of components depicted in FIGS. 2A-2E is merely exemplary, and more, fewer, and/or alternative components may be provided in the same or different configurations as needed for a particular surface treatment process. Although the articles 30 depicted in FIGS. 2A-2E are provided as shoe parts, other types of articles, including those with different shapes, sizes, materials, constructions, and/or different dimensionalities, may be treated and monitored for quality control as well. For example, an article may be flat, or may be multi-dimensional (e.g., such as a curved bottom unit of an article of footwear).

Additionally, the methods for comparing the temperature indications obtained from a thermal profile with model temperature ranges of corresponding model regions of a standard model may be adjusted based on a number of factors. For example, a time period for obtaining the thermal profile of the article after the surface treatment is applied may be selected to limit an amount of heat-transfer that occurs between application of the surface treatment and obtaining of the thermal profile, so that further temperature change that obscures the effect of the surface treatment is limited. Additionally, multiple temperature ranges may be used in the quality control process for a single article, depending on which surface treatment is used and the desired corresponding temperature ranges for each of the surface treatments (e.g., a heating process may be different than an adhesive application process, etc.). Additionally, temperature ranges may be different based on whether a process is used that transfers heat to the articles (e.g., a heating process in an oven), or extracts or redistributes heat from the article (e.g., due to application of a material, such as an adhesive, that absorbs thermal energy from the article).

Figure 3B:
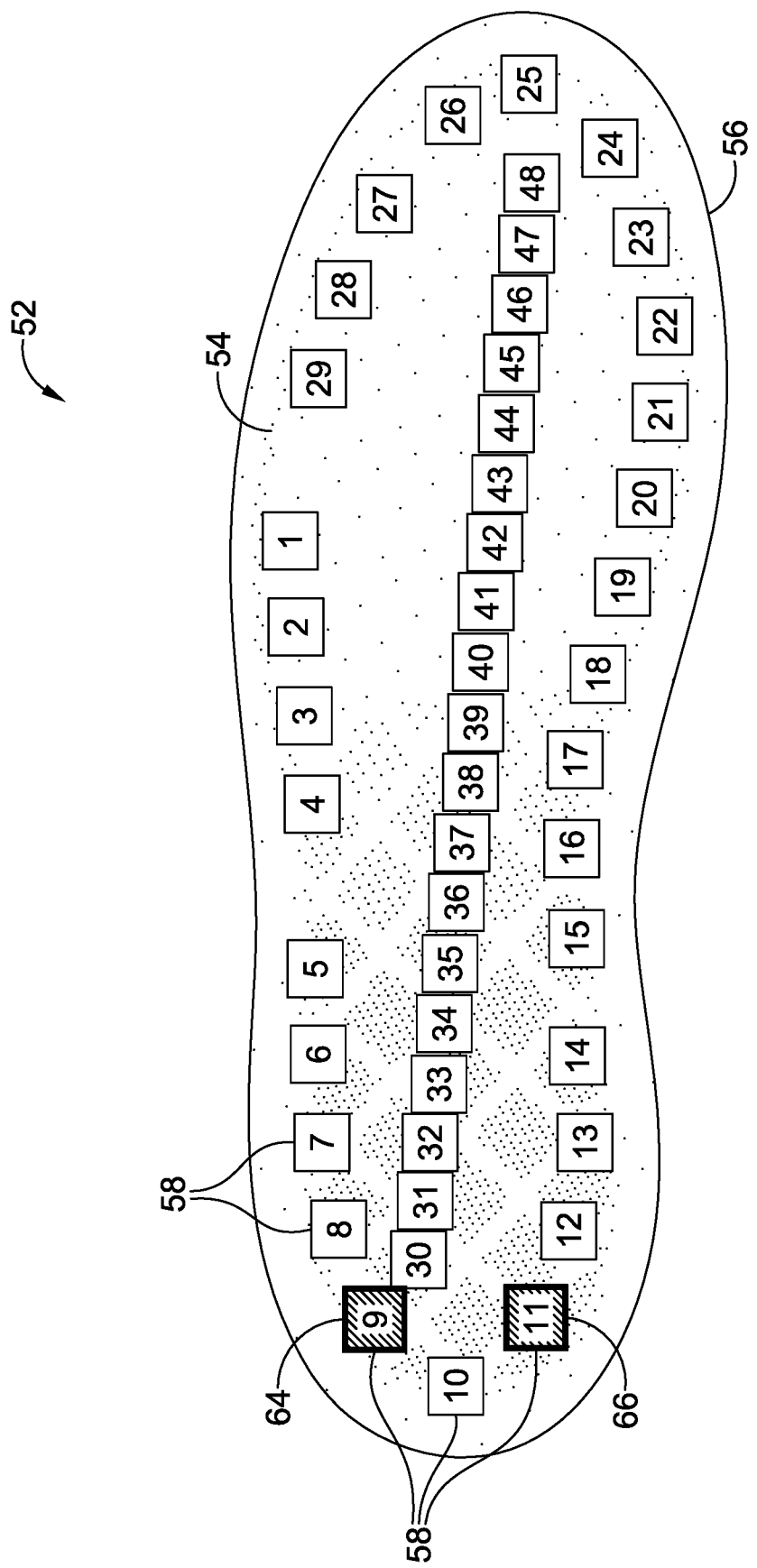
FIG. 3B depicts the thermal profile of FIG. 3A with selected regions identified for analysis, in accordance with an aspect hereof.

Referring to FIG. 3A, a thermal profile 52 of a portion 54 of an article 56 that has been treated with a surface treatment (e.g., a heat-treatment process or a plasma treatment process) is provided, in accordance with an aspect hereof. In FIG. 3A, the article 56 is depicted as a midsole portion of a shoe, which may be receiving a surface treatment in preparation for adhesive bonding, or for another purpose. For example, the midsole portion may be formed from one or more polymer materials that will be adhesively bonded with another material or article, such as an outsole. FIG. 3B depicts the thermal profile 52 of FIG. 3A with a plurality of regions 58 of the treated article 56 (i.e., regions 1-48) identified for temperature analysis. Each of the plurality of regions 58 includes a respective temperature indication that is obtained from the thermal profile 52.

Figure 3C:
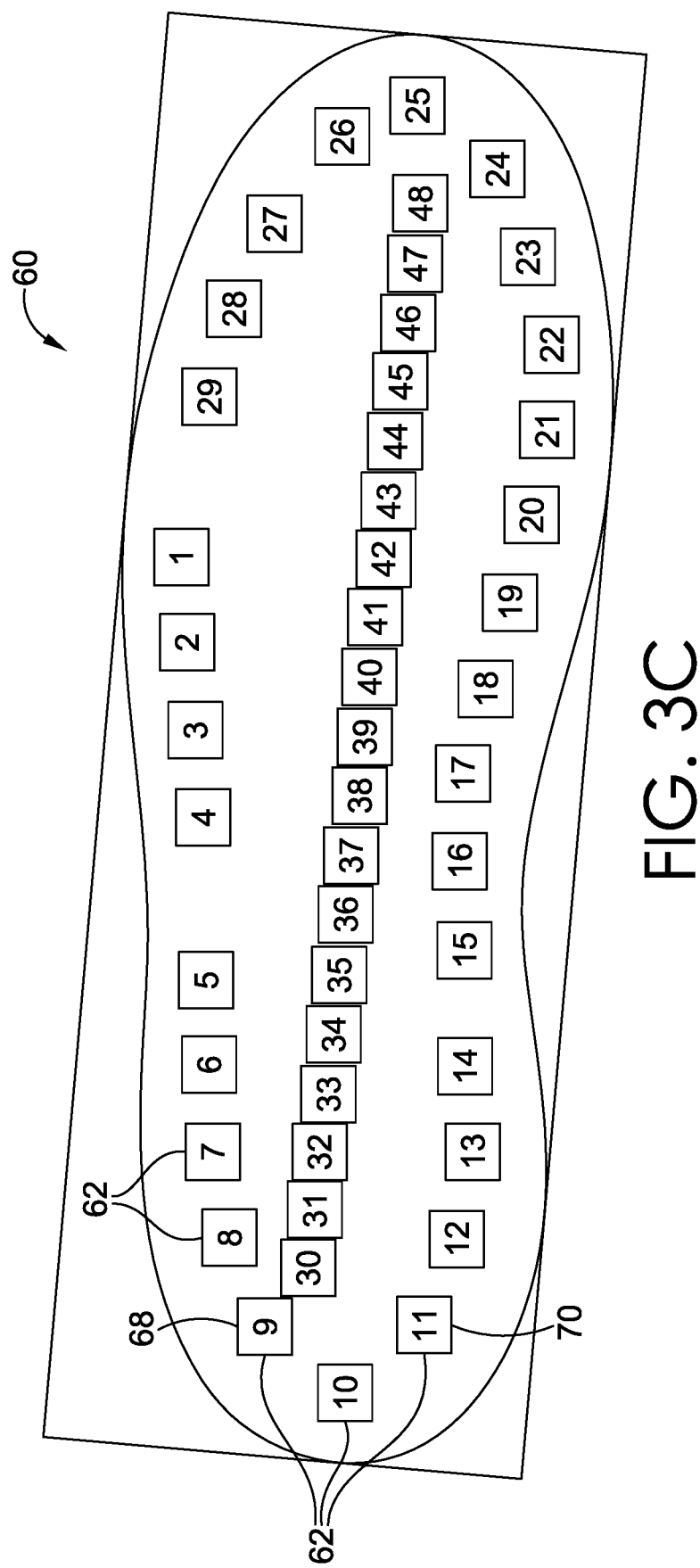
FIG. 3C depicts a standard model of the article depicted in the thermal profile of FIGS. 3A-3B, in accordance with an aspect hereof.

FIG. 3C depicts a standard model 60 of the article 56 depicted in the thermal profile 52 of FIGS. 3A-3B. The standard model 60 may be accessed by retrieving a file from a database of stored standard models using a computing device, such as the computing device 32 discussed with respect to FIGS. 2A-2E. The standard model 60 in FIG. 3C includes a plurality of model regions 62 (i.e., regions 1-48) that correspond to the plurality of regions 58 in the thermal profile 52. Each of the plurality of model regions 62 includes an associated model temperature range (e.g., a range of 100-105° F.) that is used for comparison with the temperature indications of the respective plurality of regions 58 in the thermal profile 52. The plurality of regions 58 and the plurality of model regions 62 may be distinct and non-overlapping, and/or may be overlapping in various aspects, and the temperature indications associated with each may be average temperatures for those regions. The comparison of the temperature indications with corresponding model temperature ranges in the standard model may be performed to determine if a particular surface treatment applied to the article 56 has achieved a desired effect.

To provide an exemplary comparison of the thermal profile 52 of FIG. 3B with the standard model 60 of FIG. 3C, temperature indications (i.e., temperature signatures and/or values) of first and second regions 64, 66 may be obtained from the thermal profile 52 and compared to corresponding first and second model regions 68, 70 of the standard model 60. The comparison may be used to determine if the temperature indication of the first region 64 is within the temperature range provided by the first model region 68, and if the temperature indication of the second region 66 is within the temperature range of the second model region 70.

If the temperature indications are not outside of the temperature ranges provided by the standard model 60, an indication may be provided to advance the article 56 in the manufacturing process (e.g., for subsequent processing). If at least one of the temperature indications is outside of a corresponding temperature range provided by the standard model 60, an indication to modify the manufacturing process or further process the article 56 may be provided.

For example, an indication may be provided to re-apply the surface treatment to the article 56 or to any regions of the article 56 that did not satisfy the temperature ranges of the standard model 60. Additionally, an indication may be provided to transfer the article 56 to another manufacturing station, at which an additional surface treatment may be applied. Additionally, an indication to update the parameters of the surface treatment may be provided (e.g., by modifying the operation of the surface treatment tool 22 in the system 20 of FIG. 2A). In this respect, the surface treatment may be modified by changing a duration, an area of application (e.g., a tool path), and/or an intensity of the surface treatment (e.g., an amount of surface treatment applied per square unit of measure, etc.) to adjust for the determinations of the quality control comparison.

Figure 4:
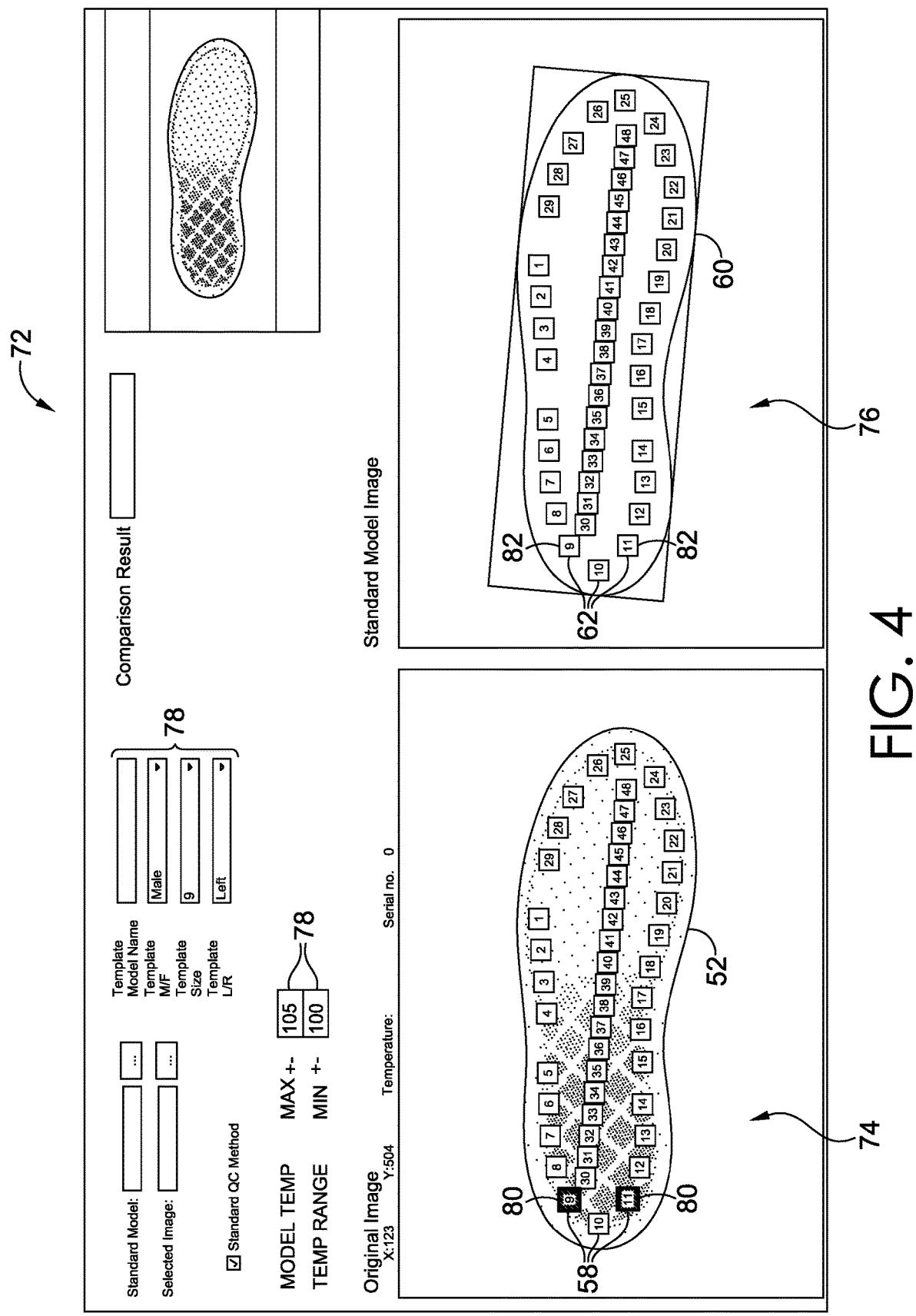
FIG. 4 depicts an exemplary graphical user interface ("GUI") for monitoring the application of a surface treatment to an article in a manufacturing process, in accordance with an aspect hereof.

Referring to FIG. 4, an exemplary graphical user interface 72 ("GUI") for monitoring the application of a surface treatment to articles in a manufacturing process is provided, in accordance with an aspect hereof. The GUI 72 includes the thermal profile 52 depicted in FIG. 3B, which is positioned in a first display area 74, and the standard model 60 depicted in FIG. 3C, which is positioned in a second display area 76. The plurality of regions 58 of the thermal profile 52 in the first display area 74 respectively correspond to the plurality of model regions 62 in the standard model 60 in the second display area 76. This side-by-side presentation allows for the temperature indications of the regions 58 of the thermal profile 52 to be compared with the temperature ranges of the corresponding model regions 62 of the standard model 60, so that regions that exceed their corresponding temperature range can be identified (e.g., automatically by a computer processor) for further or alternative processing. Further provided in the GUI 72 are input components 78 for providing article-identifying information that may be used to facilitate obtaining, generating, and/or retrieving the standard model 60 of the article 56 for comparison. The input components 78 of the GUI 72 are described in greater detail with respect to FIG. 5.

FIG. 4 shows several regions 80 of the thermal profile 52 in the first display area 74 identifying that the temperature indications for those particular regions 80 are outside of the temperature ranges of the corresponding model regions 82 in the standard model 60. As discussed herein, when one or more temperature ranges are not satisfied, one or more indications and/or notifications may be provided. For example, an alert may be provided (e.g., a sound, a pop-up, a flashing indicator, etc.), and/or the selected regions 80 that do not meet the temperature range requirements may be identified using colored, flashing, and/or otherwise visually distinguishable features. For example, as shown in FIG. 4, bolded boxes are provided around the regions 80 that fall outside of the temperature ranges of the corresponding model regions 82 in the standard model 60.

Referring to FIG. 5, an enhanced view of a portion 86 of the GUI 72 depicted in FIG. 4 is provided, in accordance with an aspect hereof. The portion 86 of the GUI 72 shown in FIG. 5 is configured to receive article-identifying information that may be used to facilitate accessing (e.g., retrieving, obtaining, and/or generating) a standard model of an article for comparison with a thermal profile. The input components 78 shown in FIG. 5 are based on the article being a shoe part, and as a result, other inputs may be used for other article types to identify appropriate features.

In the example provided in FIG. 5, the input components 78 allow for the entry of information specific to the shoe part for identification purposes. This information includes (1) a model type 88 associated with the shoe part, (2) a gender designation 90 associated with the shoe part, (3) a size 92 associated with the shoe part, and (4) a foot-side designation 94 associated with the shoe part. Additionally, some input components 78 allow for the selection of the temperature range used in the standard model. In the example provided in FIG. 5, this includes a minimum allowable temperature 96 and a maximum allowable temperature 98 for the temperature range of the model regions in the standard model. Additionally, in some aspects, a more discrete application of temperature ranges may be applied to the model regions depending on the desired specificity and granularity of the analysis. It should be noted that the input components 78 provided in FIGS. 4-5 are exemplary, and based on an article that is a shoe part, and other inputs may be used for the same or other types of articles.

Figure 6:
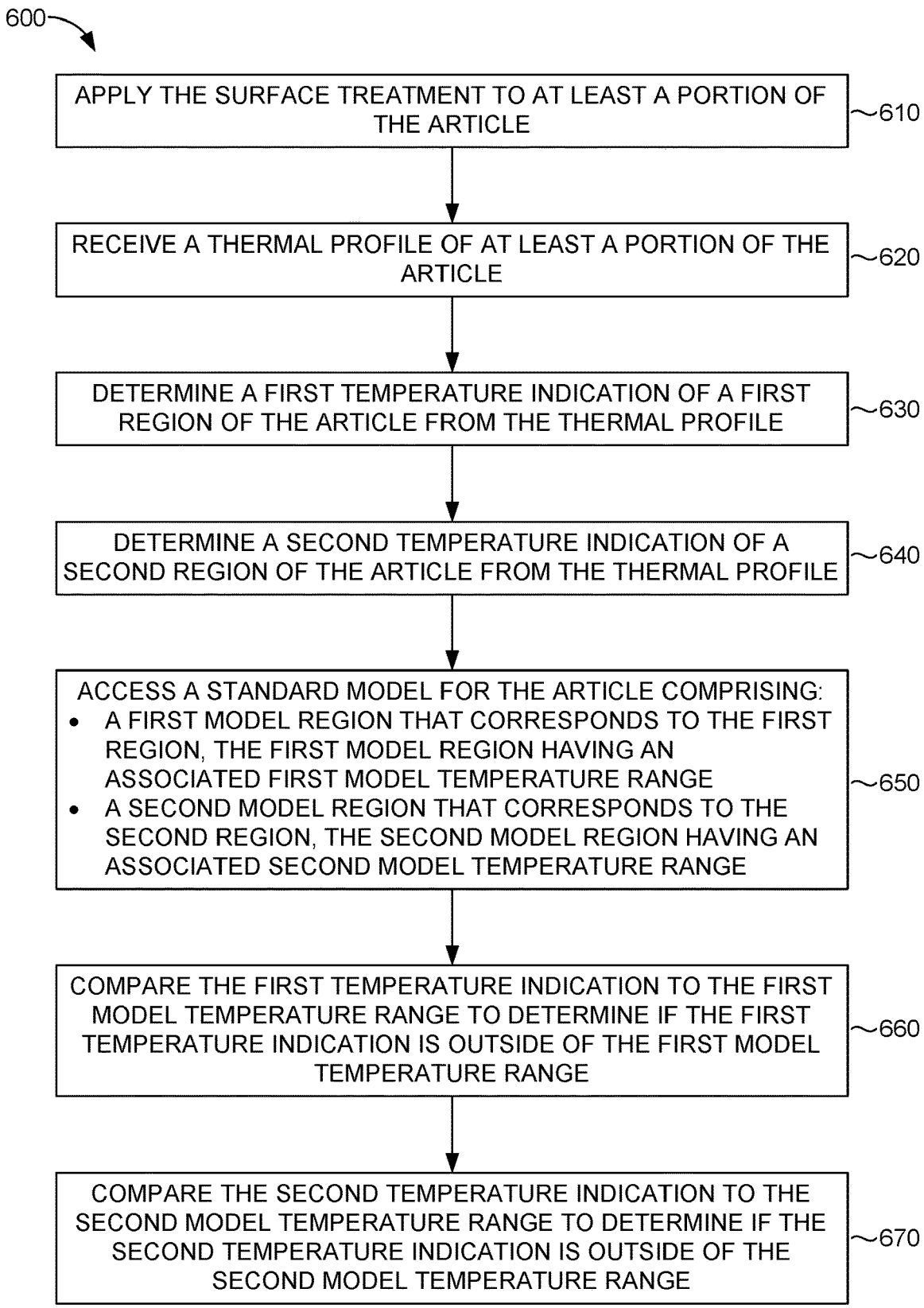
FIG. 6 depicts a block diagram of an exemplary method of monitoring the application of a surface treatment to an article in a manufacturing process, in accordance with an aspect hereof.

Referring to FIG. 6, a block diagram of an exemplary method 600 of monitoring a surface treatment applied to articles in a manufacturing process is provided, in accordance with an aspect hereof. At a block 610, a surface treatment, such as an application of heat, plasma, coating, etc., is applied to at least a portion of an article, which may be, for example, a shoe part as shown in FIGS. 2A-2E. At a block 620, a thermal profile, such as the thermal profile 52 shown in FIG. 3A, of at least a portion of the article is received. At a block 630, a first temperature indication of a first region of the article, such as the first region 64 shown in FIG. 3B, is determined from the thermal profile. At a block 640, a second temperature indication of a second region of the article, such as the second region 66 shown in FIG. 3B, is determined from the thermal profile. At a block 650, a standard model, such as the standard model 60 shown in FIG. 3C, is accessed. The standard model may include a first model region, such as the first model region 68 shown in FIG. 3C, that corresponds to the first region, the first model region having an associated first model temperature range (e.g., a minimum temperature of 120° F., or a range of 100-140° F.). The standard model may also include a second model region, such as the second model region 70 shown in FIG. 3C, that corresponds to the second region, the second model region having an associated second model temperature range (e.g., a minimum temperature of 120° F., or a range of 100-140° F.). At a block 660, the first temperature indication is compared to the first model temperature range to determine if the first temperature indication is outside of the first model temperature range. At a block 670, the second temperature indication is compared to the second model temperature range to determine if the second temperature indication is outside of the second model temperature range.

Figure 7:
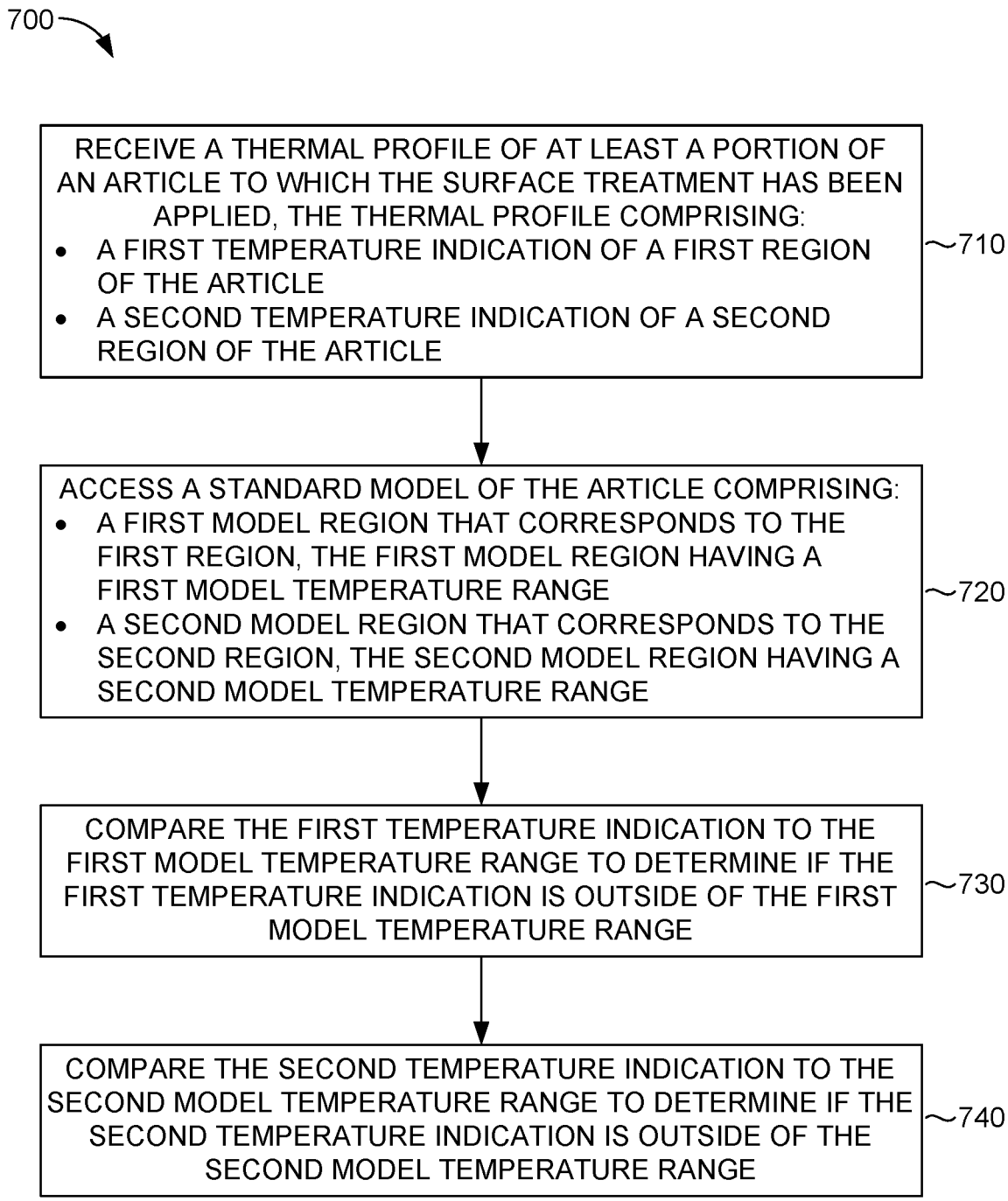
FIG. 7 depicts a block diagram of another exemplary method of monitoring the application of a surface treatment to an article in a manufacturing process, in accordance with an aspect hereof.

Referring to FIG. 7, a block diagram of another exemplary method 700 of monitoring the application of a surface treatment to articles in a manufacturing process is provided. At a block 710, a thermal profile, such as the thermal profile 52 shown in FIG. 3A, of at least a portion of an article, such as the article 56 shown in FIG. 3B, to which the surface treatment has been applied is received. The thermal profile may comprise a first temperature indication of a first region of the article, such as the first region 64 shown in FIG. 3B, and a second temperature indication of a second region of the article, such as the second region 66 shown in FIG. 3B. At a block 720, a standard model, such as the standard model 60 shown in FIG. 3C, is accessed. The standard model may include a first model region, such as the first model region 68 shown in FIG. 3C, that corresponds to the first region, the first model region having a first model temperature range. The standard model may also include a second model region, such as the second model region 70 shown in FIG. 3C, that corresponds to the second region, the second model region having a second model temperature range. At a block 730, the first temperature indication is compared to the first model temperature range to determine if the first temperature indication is outside of the first model temperature range. At a block 740, the second temperature indication is compared to the second model temperature range to determine if the second temperature indication is outside of the second model temperature range It should be noted that any number of regions may be designated in a thermal profile of an article for comparison with a corresponding number of model regions in an associated standard model of the article in order to achieve a level of specificity and granularity that is desired for a quality control process. Additionally, a minimum number of regions that do not fall outside of the corresponding temperature ranges may be established. In this respect, a level of precision that is appropriate for a particular manufacturing process may be configured.

From the foregoing, it will be seen that the technology is one well adapted to attain all the ends and objects hereinabove set forth together with other advantages, which are obvious and which are inherent to the structure. It will be understood that certain features and sub-combinations are of utility and may be employed without reference to other features and sub-combinations. This is contemplated by and is within the scope of the claims. While the subject matter of this disclosure is illustrated herein with specific examples, variations within the scope of the claims are possible and contemplated.

What is claimed is:

1. A method for monitoring the application of a surface treatment to an article during a manufacturing process, the method comprising:

determining a first temperature indication associated with a first region of a treated article;

determining a second temperature indication associated with a second region of the treated article;

comparing the first temperature indication to a first model temperature range to determine if the first temperature indication is outside of the first model temperature range;

comparing the second temperature indication to a second model temperature range to determine if the second temperature indication is outside of the second model temperature range, wherein the first model temperature range and the second model temperature range are at least partially different;

determining that the first temperature indication is outside of the first model temperature range; and in response to determining that the first temperature indication is outside of the first model temperature range, modifying the surface treatment applied to the article.

2. The method of claim 1, wherein the treated article is a shoe part.

3. The method of claim 1, wherein the first model temperature range is at least partially different than the second model temperature range based on a difference in surface treatment required for the first region of the treated article and the second region of the treated article.

4. The method of claim 1, wherein the surface treatment comprises:
an application of plasma;
an application of thermal energy;
an application of a coating; and
physical processing.

5. The method of claim 1, wherein the surface treatment applied to the treated article comprises an application of plasma provided in preparation for adhesive bonding.

6. The method of claim 1, wherein the surface treatment applied to the treated article comprises an application of thermal energy applied using an oven.

7. The method of claim 1, wherein the surface treatment applied to the treated article comprises an application of a coating, and wherein the coating comprises an adhesive, a paint, a dye, or a primer.

8. The method of claim 1, wherein modifying the surface treatment comprises:
transferring the treated article to a manufacturing station; and
applying a separate surface treatment to the first region of the treated article.

9. The method of claim 1, wherein modifying the surface treatment comprises:
modifying at least one of:
a duration of the surface treatment,
an area of application of the surface treatment, and
an intensity of the surface treatment.

10. The method of claim 1, further comprising:
discarding or recycling the treated article.

11. The method of claim 1, further comprising:
receiving article-identifying information for the treated article which comprises a shoe part; and
using, at least in part, the article-identifying information to access a standard model of the shoe part that includes the first model temperature range and the second model temperature range.

12. The method of claim 11, wherein the article-identifying information comprises at least one of:
a model type associated with the shoe part,
a size associated with the shoe part,
a gender associated with the shoe part, and
a foot-side designation associated with the shoe part.

13. A system for monitoring the application of a surface treatment to an article during a manufacturing process, the system comprising:
a surface treatment tool;
a thermal-imaging device; and
a computing device configured to:
receive a thermal profile of at least a portion of a treated article from the thermal-imaging device,
determine a first temperature indication associated with a first region of the treated article,
determine a second temperature indication associated with a second region of the treated article,
compare the first temperature indication to a first model temperature range to determine if the first temperature indication is outside of the first model temperature range,
compare the second temperature indication to a second model temperature range to determine if the second temperature indication is outside of the second model temperature range, and
in response to determining that the first temperature indication is outside of the first model temperature range and/or in response to determining that the second temperature indication is outside of the second model temperature range, modify the surface treatment applied to the article.

14. The system of claim 13, wherein the surface treatment tool comprises one of:
a plasma tool;
a thermal energy tool;
a coating tool; or
a physical processing tool.

15. The system of claim 13, wherein the computing device is further configured to
provide an indication to modify at least one of:
a duration of the surface treatment,
an area of application of the surface treatment, and
an intensity of the surface treatment.

16. The system of claim 13, further comprising a part-transfer tool configured to transfer the treated article to a separate manufacturing station for application of an additional surface treatment when it is determined that the first temperature indication is outside of the first model temperature range and/or that the second temperature indication is outside of the second model temperature range.

17. The system of claim 13, further comprising at least one input device for receiving article-identifying information useable for accessing a standard model that includes the first model temperature range and the second model temperature range.

18. The system of claim 13, further comprising a conveyor that advances a plurality of articles for treatment by the surface treatment tool.

19. A method for monitoring the application of a surface treatment to an article during a manufacturing process, the method comprising:
determining a first temperature indication associated with a first region of a treated article;
determining a second temperature indication associated with a second region of the treated article;
comparing the first temperature indication to a first model temperature range to determine if the first temperature indication is outside of the first model temperature range; and
comparing the second temperature indication to a second model temperature range to determine if the second temperature indication is outside of the second model temperature range;
determining that the first temperature indication is outside of the first model temperature range; and
in response to determining that the first temperature indication is outside of the first model temperature range, discarding the article.

20. The method of claim 19, wherein the article is a shoe part.

* * * * *